United States Patent [19]
Eng et al.

[11] 3,904,495
[45] Sept. 9, 1975

[54] ELECTROLYTIC-ELECTRODIALYTIC AND CHEMICAL MANUFACTURE OF CHLORINE DIOXIDE, CHLORINE AND CHLORIDE-FREE ALKALI METAL HYDROXIDE

[75] Inventors: Jeffrey D. Eng, North Vancouver; Cyril J. Harke, Burnaby, both of Canada

[73] Assignee: Hooker Chemicals & Plastics Corporation, Niagara Falls, N.Y.

[22] Filed: Jan. 2, 1974

[21] Appl. No.: 430,005

[52] U.S. Cl. .............. 204/93; 204/98; 204/101; 204/128
[51] Int. Cl. ...... C01b 17/96; C01d 1/06; C01b 7/06
[58] Field of Search ........ 204/98, 101, 93, 128, 296

[56] References Cited
UNITED STATES PATENTS

| | | | |
|---|---|---|---|
| 3,222,267 | 12/1965 | Tirrell et al. | 204/98 |
| 3,607,027 | 9/1971 | Westerlund | 204/101 |

*Primary Examiner*—R. L. Andrews
*Attorney, Agent, or Firm*—Peter F. Casella

[57] ABSTRACT

Chlorine dioxide, chlorine, alkali metal hydroxide, alkali metal sulfate and hydrogen are made from alkali metal chloride, alkali metal chlorate, hydrogen chloride, sulfuric acid and water in an electrolytic-electrodialytic cell containing at least seven compartments and having alternating anion-active and cation-active permselective membranes separating the compartments. By feeding particular reactants or mixtures thereof to certain compartments from which component ions selectively diffuse to other compartments under influence of the applied voltage, reactions take place in the compartments, selectively yielding chlorine dioxide and chlorine mixtures, alkali metal sulfate, hydrogen, substantially chloride-free alkali metal hydroxide, spent sulfuric acid from a different compartment than that of the alkali metal sulfate and spent alkali metal chloride and chlorate mixtures.

The process is particularly useful in producing chlorine and chlorine dioxide for woodpulp bleaching and in producing alkali metal sulfate free of sulfuric acid, for processes utilizing such sulfate.

10 Claims, 1 Drawing Figure

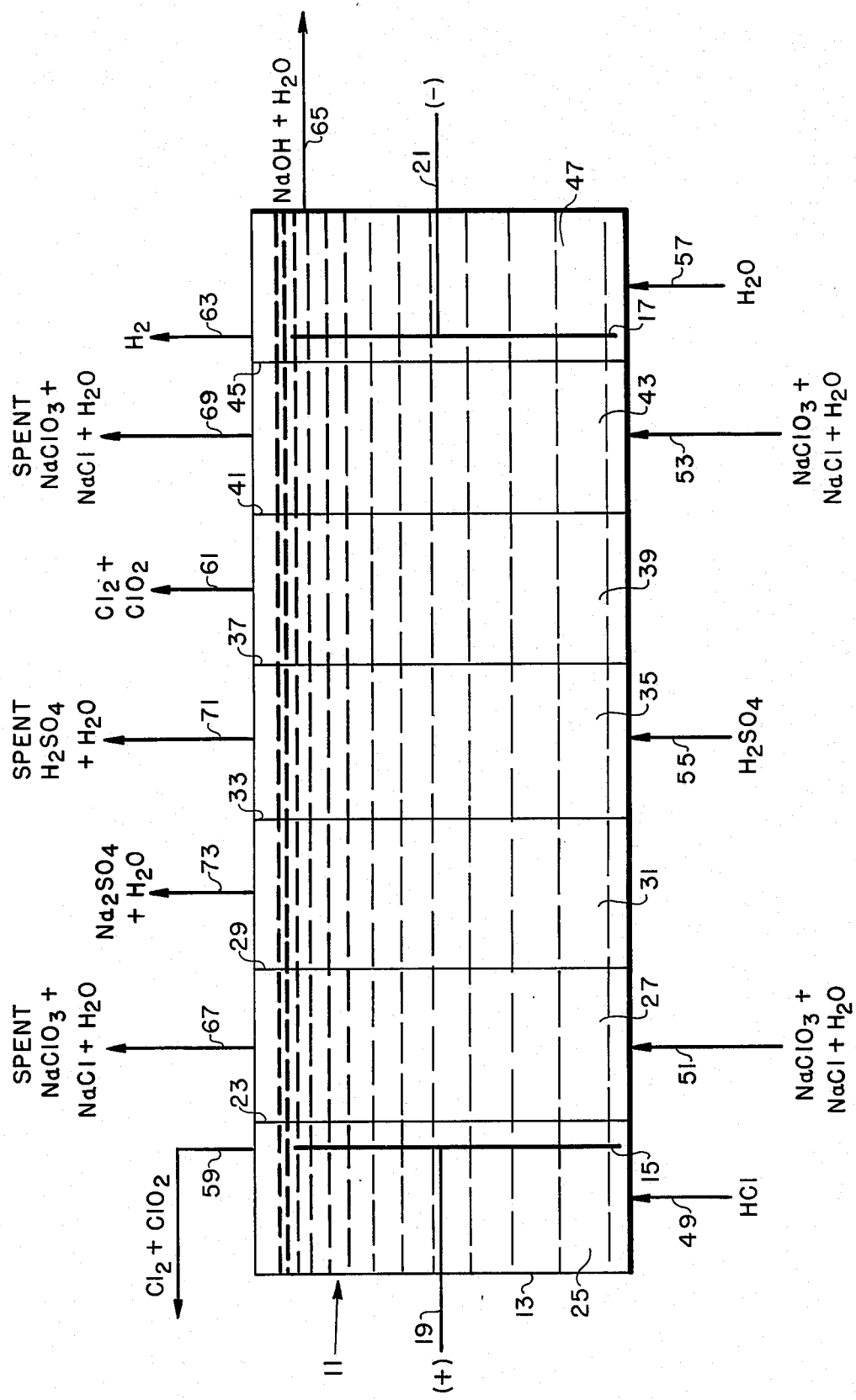

ELECTROLYTIC-ELECTRODIALYTIC AND CHEMICAL MANUFACTURE OF CHLORINE DIOXIDE, CHLORINE AND CHLORIDE-FREE ALKALI METAL HYDROXIDE

The present invention relates to a novel method for preparing chlorine dioxide, chlorine and alkali metal hydroxide solutions. More particularly, it is of a novel electrochemical method of preparing these products from sulfuric acid and alkali metal chlorides and chlorates wherein the byproduct alkali metal sulfate is substantially free of sulfuric acid.

Chlorine dioxide is an important bleaching agent, especially for woodpulp in the papermaking industry. Usually chemical production of this compound is effected by reacting alkali metal chloride and chlorate under strongly acidic conditions, producing the desired compound, together with chlorine. Most frequently, the acidifying agent employed is sulfuric acid and the spent acid from the process is obtained mixed with alkali metal sulfate. Separation of the sulfuric acid-alkali metal sulfate mixture to recover the sulfuric acid values therein (free acid and separate salt) for recycling to the chlorine dioxide process or other use in a pulping or bleach plant is tedious and costly, generally utilizing rather elaborate equipment to crystallize the sulfate from the acid to obtain pure components. Moreover, conventional procedures for manufacturing chlorine dioxide do not provide chloride-free alkali metal hydroxide solutions, which solutions also are desirable reagents for the woodpulp and papermaking industry.

The aforementioned disadvantages of the prior art are overcome by the present invention, which is of a novel electrolytic-electrodialytic method that produces chlorine dioxide, chlorine and chloride-free alkali metal hydroxide solution, together with hydrogen, from sulfuric acid, alkali metal chlorate, alkali metal chloride and water, while providing byproduct alkali metal sulfate substantially free of sulfuric acid and acid substantially free of salt. This process comprises electrolyzing and electrodialyzing in a cell having an anode compartment with an anode therein, a buffer compartment $B^1$; a sulfate compartment S, an acid compartment H, a chlorine dioxide generating compartment G, a buffer compartment $B^2$, and a cathode compartment with a cathode therein, there being from one to one hundred sets of compartments $B^1$, S, H and G intermediate the anode and $B^2$ compartments, with the anode compartment being separated from $B^1$ by an anion-active permselective membrane $M^{a-1}$, $B^1$ and S compartments being separated by a cation-active permselective membrane $M^{c-1}$, S and H compartments being separated by an anion-active permselective membrane $M^{a-2}$, H and G compartments being separated by a cation-active permselective membrane $M^{c-2}$, G and $B^2$ compartments being separated by an anion-active permselective membrane $M^{a-3}$ and the $B^2$ and cathode compartments being separated by a cation-active permselective membrane $M^{c-3}$, aqueous solutions resulting from feeding hydrogen chloride to the anode compartment, alkali metal chlorate and chloride to compartments $B^1$ and $B^2$, sulfuric acid to compartment H and water to the cathode compartment so that, with passage of electric current through the cell, chloride and chlorate anions diffuse selectively from $B^1$ to the anode compartment through $M^{a-1}$, alkali metal cations diffuse selectively from $B^1$ to S through $M^{c-1}$, sulfate anions diffuse selectively from H to S through $M^{a-2}$, hydrogen cations diffuse selectively from H to G through $M^{c-2}$, chloride and chlorate anions diffuse selectively from $B^2$ to G through $M^{a-3}$, alkali metal cations diffuse selectively from $B^2$ to the cathode compartment through $M^{c-3}$, chloride, chlorate and hydrogen ions react to produce chlorine dioxide and chlorine in the anode compartment and in G, aqueous alkali metal cations and water react to produce hydrogen and substantially alkali metal chloride-free aqueous alkali metal hydroxide in the cathode compartment, and recovering chlorine and chlorine dioxide from the anode compartment and G, spent aqueous alkali metal chloride and chlorate from $B^1$ and $B^2$, substantially sulfuric acid-free aqueous alkali metal sulfate solution from S, substantially alkali metal sulfate-free spent aqueous sulfuric acid from H, and hydrogen and substantially alkali metal chloride-free aqueous alkali metal hydroxide solution from the cathode compartment.

The invention will be readily understood by reference to the descriptions of the embodiments thereof, taken in conjunction with the drawing of means for carrying out a preferred embodiment of the process.

In the drawing:

The FIGURE is a schematic diagram of a seven-compartment electrolytic-electrodialytic cell for converting alkali metal chlorate, alkali metal chloride, sulfuric acid and water to chlorine dioxide, chlorine, hydrogen, and aqueous salt-free alkali metal hydroxide, while substantially completely segregating byproduct alkali metal sulfate from spent sulfuric acid.

In the FIGURE the points of addition and withdrawal of typical and preferred reactants and products are illustrated. Although production of sodium hydroxide from sodium chloride and sodium chlorate reactants is illustrated, other alkali metal cations, such as potassium, may also be employed. Furthermore, although the FIGURE illustrates only one set of compartments $B^1$, S, H and G, positioned between the anode compartment and buffer compartment $B^2$, it will be appreciated that there may be two, four, 10, 25 or even as many as 100 or more such sets of compartments in cells useful for carrying out the present process. Of course, the sets may be S, H, G and $B^2$ with single anode, $B^1$ and cathode compartments and such are also intended to be referred to by the description herein.

In the FIGURE electrolytic-electrodialytic cell 11 includes outer wall 13, anode 15, cathode 17 and conductive means 19 and 21 for connecting the anode and the cathode to sources of positive and negative electrical potentials, respectively. Inside the walled cell, anion-active permselective membrane $M^{a-1}$ 23 separates the anode compartment 25, from buffer compartment $B^1$ 27, cation-active permselective membrane $M^{c-1}$ 29 separates $B^1$ from the sulfate compartment S 31, anion-active permselective membrane $M^{a-2}$ 33 separates S from acid compartment H 35, cation-permselective membrane $M^{c-2}$ 37 separates H from chlorine dioxide generating compartment G 39, anion-active permselective membrane $M^{a-3}$ 41 separates G from buffer compartment $B^2$ 43 and cation-active permselective membrane $M^{c-3}$ 45 separates $B^2$ from the cathode compartment 47. Hydrogen chloride, commercially obtained, made by "burning" produced hydrogen in chlorine or obtained by reacting sulfuric acid with salt, is fed to the anode compartment through line 49, preferably as an aqueous solution. Aqueous combined sodium chlorate and sodium chloride solutions are fed to $B^1$ and $B^2$ through lines 51 and 53, respectively, although separate chlorate and chloride additions may also be made. Sulfuric acid is fed to H through line 55 and water enters the cathode compartment through line 57. Of course, water may also be added to the other compartments, as needed or desired. During electrolysis and electrodialysis within the cell, chloride, chlorate and hydrogen ions react to form chlorine dioxide and chlorine in the anode compartment and in G, additional chlorine also being produced by anodic oxidation of hydrogen chloride. The chlorine and chlorine dioxide mixtures are withdrawn from the anode compartment and from G through lines 59 and 61, respectively. In the cathode compartment sodium cations are reacted with water at the cathode to produce hydrogen, which is withdrawn through line 63, and substantially sodium chloride-free aqueous sodium hydroxide solution, which is removed through line 65. It may also be considered that the sodium ion is reduced at the cathode to sodium, which then reacts with water to make hydrogen and caustic solution. Spent, aqueous sodium chloride and chlorate solutions in $B^1$ and $B^2$ are withdrawn through lines 67 and 69, respectively, sulfuric acid substantially free of sodium sulfate is withdrawn from H through line 71 and aqueous sodium sulfate solution, substantially free of sulfuric acid, is taken off from S through line 73.

The present process combines electrolytic and electrodialytic techniques to carry out in the anode and G compartments of the cell the conversion of chlorate, chloride and hydrogen ions to chlorine dioxide and chlorine according to Equation (1)

$$2ClO_3^- + 2Cl^- + 4H^+ \rightarrow 2ClO_2 + Cl_2 + 2H_2O$$

(1)

Furthermore, the production of chlorine, in itself a valuable bleaching agent, is augmented in the present process by electrolytic oxidation of hydrogen chloride at the anode according to Equation (2)

$$4HCl \rightarrow 2Cl_2 + 4H^+ + 4e^-$$

(2)

The present process also produces aqueous alkali metal hydroxide and hydrogen by cathodic reaction of alkali metal cation with water, as is illustrated in Equation (3).

$$2H_2O + 2M^+ + 2e \rightarrow 2MOH + H_2$$

(3), wherein M represents an alkali metal cation, such as sodium or potassium.

Unlike aqueous caustic solutions obtained by conventional electrolysis of alkali metal chlorides, the alkali metal hydroxide solutions produced by the present process are substantially free of alkali metal chloride, containing less than about 1%, and usually less than 0.1% by weight of the chloride salt. The salt-free condition of the caustic is achieved because the $M^{c-3}$ cation-active permselective membrane is substantially impermeable to chloride anions and does not permit their diffusion into the cathode compartment. The substantially chloride-free caustic solutions produced are suitable, without further purification, for many applications wherein the presence of chloride cannot be tolerated, such as pulping wood chips, neutralizing acids, peroxide bleaching, making caustic sulfite and regenerating ion exchange resins.

In addition to the aforementioned advantages the present process produces, as byproduct, alkali metal sulfate solutions which are substantially free of sulfuric acid and even the spent sulfuric acid also resulting is substantially free of sulfate salt. Thus, in the present process, electrodialyses at the described locations of the various anion and cation-active membranes not only distribute the appropriate reactants to the appropriate compartments for the production of the desired chlorine dioxide, chlorine and caustic products but also substantially segregate sulfuric acid from alkali metal sulfate. The latter result is achieved because anion-active permselective membranes $M^{a-1}$ and $M^{a-2}$ are substantially impermeable to hydrogen ion and prevent its diffusion from the anode compartment and from H into the sulfate compartments. Similarly, anionactive permselective membranes $M^{a-2}$ and $M^{a-3}$ are substantially impermeable to alkali metal cation and prevent its diffusion from sulfate compartment S and from chlorine dioxide generating compartment G to acid compartment H. The sulfate-free aqueous sulfuric acid obtained in the present process can be readily concentrated by known techniques, and without further purification can be recycled to the present process. The sulfuric acidfree alkali metal sulfate solution which is also obtained as a byproduct in the present process can also be concentrated, if desired or if advantageous, and may be used as a reagent material, without further purification, in either concentrated or dilute form. For example, the alkali metal sulfate solution, as produced, can be employed as a starting material for the electrochemical generation of hydrogen peroxide and caustic according to the process of our copending application entitled "Electrolytic Production of Hydrogen Peroxide and Alkali Metal Hydroxide," Ser. No. 430,004, (Case 3,220) filed of even date with the present application.

The hydrogen chloride charged to the anode compartment can be hydrogen chloride gas bubbled or sparged into the anolyte liquor but preferably is concentrated or nearly concentrated aqueous hydrochloric acid (a hydrogen chloride solution containing about 30 to 40% hydrogen chloride, by weight, preferably about 38%). The feed rate of hydrogen chloride to the anode compartment will normally be sufficient to maintain the anolyte liquor strongly acidic, advantageously at a pH at or near that of an aqueous solution saturated with hydrogen chloride, which is about 1. Usually, concentrated aqueous hydrochloric acid is charged at a rate which maintains this pH and which produces the desired amount of total chlorine and chlorine dioxide, generally corresponding to from 1 to 10 tons/day, preferably about 3 tons/day of chlorine.

Alkali metal chloride and alkali metal chlorate are conveniently charged to compartments $B^1$ and $B^2$ as common aqueous solutions. Preferably the chlorate and chloride will be dissolved in a single aqueous feed stream which will be divided to feed each compartment. The concentration of alkali metal chlorate and chloride in each feed stream can vary from about 1 Normal to about the saturation concentration of each salt in water but preferably the concentration of chlorate and chloride in the $B^1$ and $B^2$ feed streams is about 2 to 10 Normal, most preferably about 3 Normal. The rates of delivery of the chlorate-chloride feed streams to $B^1$ and to $B^2$ are generally about the same for each compartment but may be varied, usually being within the ±50% range. The rates of withdrawal of chloride-chlorate solutions from compartments $B^1$ and $B^2$ will normally be such that from 2 to 50%, preferably 2 to 20%, of the chlorate and chloride are present in the spent reagent streams, with the stream normalities usually being from 0.1 to 3 N in chlorate and chloride, preferably 0.1 to 1 N, e.g., 0.5 N.

The sulfuric acid charged to acid compartment H, is usually a concentrated aqueous sulfuric acid containing above about 80% by weight sulfuric acid. Preferably, the sulfuric acid feed to H is aqueous sulfuric acid containing about 93 to 97% by weight sulfuric acid. Of course, if desired, stronger concentrations of sulfuric acid, including pure sulfuric acid, are used instead. Spent acid solution is withdrawn from the acid compartment H at a volume rate which is about equal to the feed rate less 5 to 25%. Generally the spent aqueous sulfuric acid solution recovered from it has a sulfuric acid content of about 0.5 to 6 N, preferably 1 to 3 N, e.g., 2 N. Its sodium sulfate content is generally less than 5%, preferably less than 1 or 0.1%. Sodium sulfate produced is at about 6 Normal.

Water for the various reactions, to maintain the cell volume and to produce the desired solutions, is delivered continuously to the cathode compartment to replenish that lost by electrolytic reaction or withdrawn in solutions of products and byproducts. Generally it is fed to the cathode compartment or the cathode plus other compartments but usually at least 25% and preferably at least 50% is charged to the cathode compartment.

The gaseous product mixture of chlorine dioxide and chlorine can be used directly and effectively in many bleaching applications. However, if desired, the chlorine dioxide can be separated from the chlorine gas by contacting the mixture with water, preferably flowing countercurrent to the gaseous mixture, so as to preferentially absorb the dioxide in the water. Conveniently, the separation is effected in a vertical chlorine dioxide absorption tower with water being fed to the top of the tower, the gaeous chlorine-chlorine dioxide mixture being charged to the base of the tower and aqueous chlorine dioxide (generally as a 2 to 10%, preferably 4% solution, by weight) being recovered at the base of the tower. Chlorine gas, purified of the dioxide, is recovered near the top of the tower and can be utilized directly as a bleach or in chemical synthesis, such as the production of hypochlorites. The separatingg tower for chlorine-chlorine dioxide is illustrated in FIG. 4 of an article by W. H. Rapson, appearing in Vol. 36, Canadian Journal of Chemical Engineering (1958), at page 3, the pertinent subject matter of which article is hereby incorporated herein by reference.

In initiating the electrolytic-electrodialytic process of the invention the anode compartment of the present cell is filled with concentrated hydrochloric acid, then compartments $B^1$, G and $B^2$ are filled with the aqueous chlorate-chloride solutions to be used in the process and compartment H is filled with the concentrate sulfuric acid feed solution. Compartment S and the cathode compartment are filled with water containing a small concentration, e.g., about 0.1 to 1%, of an appropriate electrolyte, e.g., $Na_2SO_4$ and NaOH, respectively, to facilitate conductivity through the cell. Advantageously, to avoid any initial delay in production of chlorine dioxide and chlorine from compartment G the chlorate-chloride solution therein is made strongly acidic, as by acidification to the pH of the anolyte acid solution or the compartment H solution. If desired, the cell is provided with agitation means in the anode compartment and compartment G so as to facilitate the chemical reaction of chlorate, chloride and hydrogen ions. Such means can also be used in the other cell compartments.

The electrochemical cell of the present process operates at a voltage of about 3.0 to 7 volts, preferably about 3.5 to 6 volts, and usually most preferably, about 5 volts. The current density of the cell is about 0.5 to 4, preferably about 1 to 3 and usually is about 3 amperes per square inch of electrode surface. The current efficiency of the present cell is generally at least about 85%, or greater and, under preferred operating conditions, may be about 95 to 98% or even greater. The caustic efficiency of the electrolytic cell is generally greater than about 75% and under preferred operating conditions is about 85 to 90% or greater.

The present electrolytic-electrodialysis process is generally carried out at a temperature ranging from room temperature to a temperature below the normal boiling of the cell contents, i.e., below about 105°C. Preferably, the present process is effected at a temperature of about 75° to 95°C., with operating temperatures in the range of about 90° to 95°C. being especially preferred.

The anion and cation-active membranes utilized in the invention to divide the electrolytic cell into compartments and to provide selective ion diffusion are usually mounted in the cell on networks of supporting material(s), such as polytetrafluoroethylene, perfluorinated ethylene-propylene copolymer, polypropylene, asbestos, titanium, tantalum, niobium or noble metals. Preferably polytetrafluoroethylene is employed.

The anion-active and cation-active permselective membranes are well-known organic polymeric films, represented by an extensive class of proprietary materials. They normally contain a multiplicity of ionic substituents which are capable of undergoing ion-exchanges iwth aqueous anions or cations. Anion-active membranes typically contain, as ionic substituents, quaternary ammonium groups, such as tetra(-lower alkyl)-substituted positively charged nitrogen or N-lower alkyl-substituted pyridinium groups, wherein the lower alkyl groups are of 1 to 6 carbon atoms. Anions, when contacted in aqueous solution with such membranes, may diffuse through the membrane via ion exchange at the quaternary ammonium substituents, while the membrane remains impermeable toward cations in the solutions. Cation-active permselective membranes typically may contain, an ionic substituents, sulfonate or phosphonate groups. Cations brought into contact in aqueous solutions with the cation-active membranes, diffuse through them via ion exchange at the sulfonate or phosphonate substituents while the membrane remain impermeable with respect to anions in the solution. Anion-exchange polymeric membranes can be prepared by conventional polymerizations of one or more ethylenically unsaturated monomers and thereafter subjection of the polymer to a conventional reaction sequence for introducing quaternary ammonium groups. For example, styrene can be polymerized to polystyrene, skived to thin sheets and then subjected sequentially to conventional chloromethylation, amination, and quaternization reactions. Additionally, vinyl chloride can be polymerized to polyvinyl chloride, the chloride substituents of the polymer can be replaced by primary amino groups by conventional amination methods and the resultant amino groups can be converted to quaternary nitrogen or amino groups by a conventional quaternization reaction, e.g., a reaction of the primary amino-substituted polymer with a lower alkyl halide. As an alternative to the above synthetic routes, an ethylenically unsaturated monomer containing an amino substituent, e.g., vinyl pyridine, can be polymerized and the amino groups of the resultant polymer can then be subjected to quaternization.

Cation-active polymeric membranes can be prepared by synthetic routes analogous to those described in the case of anion-active polymeric membranes. Thus, ethylenically unsaturated monomers, such as ethylene, fluorinated olefins, vinyl chloride, styrene and the like can be homo- or co-polymerized and a thin sheet of the resultant polymer can then be subjected to conventional phosphonation or sulfonation to introduce phosphonate or sulfonate substituents. Other polymers, such as phenol formaldehyde condensates, can be sulfonated according to known techniques, to introduce sulfonate groups. Alternatively, an ethylenically unsaturated monomer containing a halosulfonyl substituent, e.g., a fluorosulfonated perfluorovinyl ether, can be polymerized and the halosulfonyl groups of the resultant polymer can be hydrolyzed to produce a polymer containing a multiplicity of sulfonic substituents. Such products may also be subjected to post-treatments to selectively form amides or other functional groups on one or both sides thereof.

The structures and preparation of anion- and cation-active permselective membranes are more particularly described in the chapter entitled "Membranes" in the *Encyclopedia of Polymer Science and Technology*, published by J. Wiley and Sons (1968), at volume 8, pages 620–638, and in the chapter entitled "Synthetic Resin Membranes" in *Diffusion and Membrane Technology*, Rheinhold Publishing Corp., New York (1962), at pages 200–206, the pertinent subjects matter of which are incorporated herein by reference.

In addition to the anion-active membranes listed above, typical representative anion-active permselective membranes include the following proprietary polymers containing quaternary ammonium substituents: AMFion 310 series, anion type, designated by the manufacturer, American Machine and Foundry Co., as having a polymeric fluorocarbon base; Ionac MA 3148, MA 3236, MA 3475 and MA 3475 XL types, designated by the manufacturer, Ritter-Pfaudler Corporation, Permutit Division, as having a heterogeneous polyvinyl chloride base; and Amberlites, made by Dow Chemical Corp., and usually ammonium or quaternary ammonium functionalized styrene grafted onto a polymeric base, such as FEP, TFE, PVC, PE, nylon or polypropylene.

Preferably, the anion-active membrane utilized in the invention is a quaternary ammonium-substituted fluorocarbon polymer or a quaternary ammonium-substituted heterogeneous polyvinyl chloride based polymer.

In addition to the sulfonated and phosphonated cation-active polymeric membranes, carboxylated analogues may also be used. Typical representative cation-active membranes include the following proprietary polymeric membranes containing a multiplicity of sulfonate substituents: Ionac types MC 3142; 3235 and MC 3470, designated by the manufacturer, Ritter-Pfaudler Corporation, Permutit Division, as having a heterogeneous polyvinyl chloride base; Amberlites, made by Dow Chemical Corp., usually sulfonated or carboxylated polymers of types mentioned above; Nafion XR type, hydrolyzed copolymer of a perfluorinated olefin and a fluorosulfonated perfluorovinyl ether, manufactured by E. I. DuPont de Nemours and Company, Inc.; modified Nafion XR resins, made by treating one side of an XR membrane with ammonia to convert —$SO_2F$ groups to —$SO_2NH_2$ groups, which are then hydrolyzed to $SO_2NHNa$ structures; and sulfostyrenated perfluorinated ethylene propylene copolymer membranes, marketed as types 18ST12S and 16ST13S by RAI Research Corporation.

The cation-active permselective membranes which are of a sulfostyrenated derivative of a perfluorinated ethylenepropylene polymer (FEP) are useful and are considered to be superior to the Amberlites and Ionacs but most preferred are the hydrolyzed copolymers of a perfluoroolefin and a fluorosulfonated perfluorovinyl ether and modifications thereof, such as the —$SO_2N$-HNa modifications mentioned.

To manufacture the sulfostyrenated FEP membranes a standard FEP, such as is manufactured by E.I. DuPont de Nemours and Company, Inc., is styrenated and the styrenated polymer is then sulfonated. A solution of styrene in methylene chloride or benzene at a suitable concentration in the range of about 10 to 20% is prepared and a sheet of FEP polymer having a thickness of about 0.02 to 0.5 mm., preferably 0.05 to 0.15 mm., is dipped into the solution. After removal it is subjected to radiation treatment, using a cobalt$^{60}$ radiation source. The rate of application may be in the range of about 8,000 rads/hr. and a total radiation application is about 0.9 megarad. After rinsing with water the phenyl rings of the styrene portion of the polymer are monosulfonated, preferably in the para position, by treatment with chlorosulfonic acid, fuming sulfuric acid or $SO_3$. Preferably, chlorosulfonic acid in chloroform is utilized and the sulfonation is completed in about one-half hour.

Sulfostyrenated perfluoroethylene-propylene polymers of this type typically are from 16 to 18% styrenated and have two-thirds to thirteenth-sixteenth of phenyl groups therein monosulfonated.

The hydrolyzed copolymer of a perfluoroolefin and a fluorosulfonated perfluorovinyl ether is preferably prepared by employing tetrafluoroethylene as the perfluoroolefin, although other perfluorinated hydrocarbons of 2 to 5 carbon atoms may also be utilized, of which the monoolefinic hydrocarbons are preferred, especially those of 2 to 4 carbon atoms and most especially, those of 2 to 3 carbon atoms, e.g., tetrafluoroethylene, hexafluoropropylene. The sulfonated perfluorovinyl ether which is most preferred is that of the formula $FSO_2CF_2CF_2OCF(CF_3)CF_2$—$OCF$=$CF_2$. Such a material, named as perfluoro[2-(2-fluorosulfonylethoxy-)propyl vinyl ether], referred to henceforth as PSEPVE, may be modified to equivalent monomers, given by the general formula $$FSO_2CFR^1CF_2O[CFYCF_2O]_nCF=CF_2$$

wherein $R^1$ is a radical selected from the group consisting of fluorine and perfluoroalkyl radicals having from 1 to 10 carbon atoms, Y is a radical selected from the group consisting of fluorine and the trifluoromethyl radical, and n is an integer of 1 to 3 inclusive. However, it is most preferred to employ PSEPVE, as the perfluorovinyl ether.

The method of manufacture of the hydrolyzed copolymer is described in Example XVII of U.S. Pat. No. 3,282,875 and an alternative method is mentioned in Canadian patent 849,670, which also discloses the use of the finished membrane in fuel cells, characterized therein as electrochemical cells. The disclosures of such patents are hereby incorporated herein by reference. In short, the copolymer may be made by reacting PSEPVE or equivalent monomer with tetrafluoroethylene or equivalent monomer in desired proportions in water at elevated temperature and pressure for over an hour, after which time the mix is cooled. It separates into a lower perfluoroether layer and an upper layer of aqueous medium with dispersed desired polymer. The molecular weight is indeterminate but the equivalent weight is about 900 to 1,600 preferably 1,100 to 1,400, e.g., 1,250, and the percentage of PSEPVE or corresponding compound is about 10 to 30%, preferably 15 to 20% and most preferably about 17%. The unhydrolyzed copolymer may be compression molded at high temperature and pressure to produce sheets or membranes, which may vary in thickness from 0.02 to 0.5 mm. These are then further treated to hyrolyze pendant —$SO_2F$ groups to —$SO_3H$ groups, as by treating with 10 % sulfuric acid or by the methods of the patents previously mentioned. The presence of the —$SO_3H$ groups may be verified by titration, as described in the Canadian patent. Additional details of various processing steps are described in Canadian patent 752,427 and U.S. Pat. No. 3,041,317, also hereby incorporated by reference.

Because it has been found that some expansion accompanies hydrolysis of the copolymer it is particularly desirable to position the copolymer membrane after hydrolysis onto a frame or other support which will hold it in place in the electrolytic cell. Then it may be clamped or cemented in place and will be true, without sags. The membrane is preferably joined to the backing tetrafluoroethylene or other suitable support filaments prior to hydrolysis, when it is still thermoplastic and the film of copolymer covers each filament, penetrating into the spaces between them and even around behind them, thinning the films slightly in the process, where they cover the filaments.

The aminated and hydrolyzed improvements or modifications of the polytetrafluoroethylene-PSEPVE copolymers are made, as previously indicated, by treatment with ammonia on one side of the copolymer, before hydrolysis thereof, and then hydrolysis with caustic or other suitable alkali. Acid forms may also be utilized. The final hydrolysis may be conducted after the membrane is mounted on its supporting network or screen. The membranes so made are fluorinated polymers having pendant side chains containing sulfonyl groups which are attached to carbon atoms bearing at least one fluorine atom, with sulfonyl groups on one surface being in —$(SO_2NH)_nM$ form, where M is H, $NH_4$, alkali metal or alkaline earth metal and n is the valence of M, and the sulfonyls of the polymers on the other membrane surface being in —$(SO_3)_pY$ or —$SO_2F$ form, wherein Y is a cation and p is the valence of the cation, with the requirement that when Y is H, M is also H. In use of the sulfonamide side faces the cathode.

A complete description of methods for making the above improved membrane is found in French patent No. 2,152,194, of E. I. DuPont de Nemours and Company, Inc., corresponding to U.S. Pat. No. application Ser. No. 178,782, filed Sept. 8, 1971 in the name of Walther Gustav Grot, which disclosures are hereby incorporated herein by reference.

The hydrolyzed copolymer membranes are more stable at elevated temperatures, e.g., above 65°C. They last for much longer time periods in the medium of the chloride-chlorate electrolyte and the caustic product and do not as quickly become objectionably brittle, even in the presence of the bleaching gases and at high cell temperatures. Considering the savings in time and fabrication costs, the present hydrolyzed copolymer membranes are more economical. The voltage drop through such a membrane is acceptable and does not become inordinately high, as it does with many other cation-active membrane materials, when the caustic concentration in the cathode compartment increases to above about 200 g./l. of caustic. The selectivity of the membrane and its compatibility with the electrolyte do not decrease detrimentally as the hydroxyl concentration in the catholyte liquor increases, as has been noted with other membrane materials. Furthermore, the caustic efficiency of the electrolysis does not diminish as significantly as it does with other membranes when the hydroxyl ion concentration in the catholyte increases. These differences are significant in making the present process more advantageous than those of the prior art. While the more preferred hydrolyzed copolymers are those having equivalent weights of 900 to 1,600, with 1,100 to 1,400 being most preferred, some useful resinous membranes employed in the present method may be of equivalent weights from 500 to 4,000. The medium equivalent weight polymers are preferred because they are of satisfactory strength and stability, enable better selective ion exchange to take place and are of lower internal resistances, all of which are importanat to the present electrochemical process.

The improved versions of the tetrafluoroethylene-PSEPVE copolymers made by chemical treatment of surfaces thereof to modify the —$SO_3H$ groups thereon may have the modification only on the surface or extending as much as half way through the membrane. The depth of the treatment will usually be from 0.001 to 0.2 mm. Caustic efficiencies of the invented processes, using such modified versions of the present improved membranes can increase about 3 to 20%, often about 10 to 20% over those with unmodified membranes.

The cation-active membranes of the process can be of different cation-active permselective membrane materials. Similarly the anion-active membranes of the process can be composed of different anion-active permselective membrane materials. Preferably, however, all of the cation-active membranes are of the same cation-active permselective material and all of the anion-active membranes are of the same anion-active permselective materials.

The membrane cells of both the anion-active and cation-active membranes of the cell will normally be from 0.02 to 0.5 mm. thick, preferably, from 0.1 to 0.3 or 0.4 mm. When mounted on a polytetrafluoroethylene, asbestos, titanium or other suitable network for support, the network filaments or fibers will usually have a thickness of 0.01 to 0.5 mm., preferably 0.05 to 0.15 mm., corresponding to up to the thickness of the membrane. Often it will be preferable for the fibers to be less than half the film thickness but filament thicknesses greater than that of the film may also be successfully employed, e.g., 1.1 to 5 times the film thickness. The networks, screens or cloths have an area percentage of openings therein from about 8 to 80%, preferably 10 to 70% and most preferably 20 to 70%. Generally the cross-sections of the filaments will be circular but other shapes, such as ellipses, squares and rectangles, are also useful. The supporting network is preferably a screen or cloth and although it may be cemented to the membrane, the hydrolyzed copolymer membrane is preferably fused to the supporting network by high temperature high pressure compression prior to hydrolysis of the copolymer. The cemented or fused membranenetwork composites are readily clamped or otherwise fastened within the cell in conventional holders or supports.

The material of construction of the cell body may be conventional, including steel, concrete or stressed concrete or other suitably strong material lined with mastics, rubbers, e.g., neoprene, polyvinylidene chloride, FEP. chlorendic acid based polyester, polypropylene, polyvinyl chloride, polytetrafluoroethylene or other suitable inert plastic, usually being in tank or box form. Substantially self-supporting structures, made of rigid polyvinyl chloride, polyvinylidene chloride, polypropylene or phenol formaldehyde resins, may be employed, preferably reinforced with molded-in fibers, cloths or webs, such as asbestos fibers.

For satisfactory and efficient operations the cell is constructed so that the volume of the compartments positioned between the anion and cathode compartments, namely the volume of compartments $(B^1, S, N, G)_{1-100} B^2$ is desirably from about 10 to 1000% of that of the sum of the volumes of the anode and cathode zones, preferably from about 50 to 200%, most preferably about 100%, and the anode and cathode zones are approximately the same, as are the $B^1$, S, H, B and $B^2$ volumes.

While the compartments of the present cell will usually be separated from each other by flat membranes and will usually be of substantially rectilinear or parallelepipedal construction, varioius other shapes, including curves, e.g., cylinders, spheres, ellipsoids; and irregular surfaces, e.g., sawtoothed or plurally pointed walls, may also be utilized. In accord with conventional electrochemical practice, pluralities of individual cells of the invention can be employed in multi-cell units, often having common feed and product manifolds, being housed in unitary structures, filter press assemblies, or the like, set up for either continuous or batch operations.

The electrodes of the cell and the conductive means attached are made of any electrically conductive material which will resists the attack of the various cell contents. In general, the cathodes are made of graphite, iron, lead dioxide on graphite, steel or noble metal, such as platinum, iridium, ruthenium or rhodium. Of course, when using the noble metals, they may be deposited as surfaces on conductive substrates, e.g., copper, silver, aluminum, steel, iron, and other electrode materials may also be only surfaces on substrates.

The anodes are also of materials or have surfaces of materials such as graphite, noble metals, noble metal alloys, noble metal oxides, noble metal oxides mixed with valve metal oxides, e.g., ruthenium oxid plus titanium dioxide, or mixtures thereof, on a substrate which is conductive. Preferably, such surfaces are on or with a valve metal and connect to a conductive metal, such as those previously described. Especially useful are platinium, platinum on titanium, platinum oxide on titanium, mixtures of ruthenium and platinum and their oxides on titanium and similar surfaces on other valve metals, e.g., tantalum. The conductors for such materials may be aluminum, copper, silver, steel or iron, with copper being much preferred.

The preferred common material for the surfaces of the cathodes and anodes is graphite, especially high density graphite, i.e., graphite of a density of about 1.68 to 1.78 g./ml. However, dimensionally stable anodes, e.g., platinum-ruthenium oxide or titanium, and steel cathodes are also superior.

The present process provides an efficient conversion of alkali metal chlorates and sulfuric acid to chlorine dioxide and other valuable reagents particularly suitable for use in the papermaking, pulp-manufacturing and pulp bleaching industries. The present invention particularly overcomes the disadvantages of prior art chlorine dioxide manufacturing techniques in its provision for sulfuric acid-free sulfate salt and sulfate salt-free sulfuric acid as byproducts of the process.

In the following examples, which illustrate but do not limit the invention, all parts are by weight, unless otherwise indicated, and all temperatures are in °C.

EXAMPLE 1

A seven-compartment electrolytic-electrodialytic cell, as illustrated in the FIGURE, is utilized to produce chlorine, chlorine dioxide, aqueous, substantially salt-free sodium hydroxide and hydrogen. The cell walls are of asbestos-filled polypropylene. The anode is of high density, unoiled graphite (Union Carbide Co. Type AGLX, of a density of 1.68–1.78 grams per milliliter) and the cathode is of mild steel and are each about 2 inches wide and about 30 inches high. The anode and cathode are communicated with sources of positive and negative direct electrical current, respectively, through graphite and copper conductor rods, respectively.

The three cation-active permselective membranes of the cell, $M^{c-1}$, $M^{c-2}$ and $M^{c-3}$, are Nafion brand membranes, manufactured byy E. I. DuPont de Nemours and Company, Inc. and sold as their XR-type membranes. The membranes are 7 mils thick (about 0.2 mm.) and are joined to a backing or supporting network of polytetrafluoroethylene (Teflon) filaments of a diameter of about 0.1 mm., woven into cloth which has an area percentage of openings therein of about 22%. The membranes were initially flat and were fused onto the Teflon cloth by high temperature, high compression pressing, with some of the membrane portions actually flowing around the filaments during the fusion process to lock onto the cloth, without thickening the membrane between the cloth filaments.

The material of the Nafion -XR permselective membranes contains a multiplicity of sulfonate substituents and is a hydrolyzed copolymer of tetrafluoroethylene and $FSO_2CF_2CF_2OCF(CF_3)CF_2OCF=CF_2$ which has an equivalent weight in the 900 to 1,600 range, about 1,250.

The anion-active permselective membranes, $M^{a-1}$, $M^{a-2}$ and $M^{a-3}$ are derived from heterogeneous polyvinyl chloride polymer containing a multiplicity of quaternary ammonium substituents. The anion-active membranes are Ionac type MA 3475 R membranes (manufactured by Ritter-Pfaudler Corporation, Permutit Division) having a thickness of about 14 mils (0.4 mm.). The membranes are mounted on Teflon cloth similar to that utilized as a supporting network for the cation-active permselective membranes, and are cemented in place.

The anode and cathode are in contact with the anion-active permselective membrane $M^{a-1}$ and the cation-active permselective membrane $M^{c-3}$, respectively, with the "flatter" sides of the membranes facing the contacting electrodes. In some experiments spacings of about 0.01 to 5 mm. and more, up to 5 cm., between the electrodes and the membranes, are utilized and satisfactory products result but the present arrangement and the absence of spacings are preferred. The interelectrode distance and the total width of the compartments $B^1$, S, H, G and $B^2$ positioned between the anode compartment and the cathode compartment are about 10 cm. and the volume ratio of anode compartment : $B^1$ : S : H : G : $B^2$:cathode compartment is about 5 : 2 : 2 : 2 : 2 : 2 : 5, with variations of 10 to 100% being satisfactory.

Prior to operation of the cell the anode compartment of the cell is filled with concentrated hydrochloric acid (aqueous hydrochloric acid containing about 38% hydrogen chloride). Buffer compartment $B^1$ is filled with aqueous chloride-chlorate feed solution which contains about 3 Normal sodium chlorate and about 3 Normal sodium chloride. Sulfate compartment S is filled with water containing a small concentration (about 1%) of sodium sulfate to provide electrical conductivity through the compartment. Acid compartment H is filled with concentrated sulfuric acid (aqueous sulfuric acid containing about 93% sulfuric acid). Chlorine dioxide generating compartment G and buffer compartment $B^2$ are filled with the above-described chloride-chlorate feed solution, the solution in compartment B being acidified to about the pH of the liquor in the anode compartment by addition of hydrochloric acid. The cathode compartment is filled with water containing a small concentration (about 1%) of sodium hydroxide to provide for electrical conductivity through the compartment. The cell is heated to about 90°C. and the tantalum clad copper conductor rods of the anode and cathode are connected to a direct source of electrical current. As current passes through the heated cell, at a temperature of about 75°C., the concentrated hydrochloric acid is fed to the anode compartment at a rate of about 500 lbs./hr.; the aqueous chloride-chlorate feed solution is fed to compartment $B^1$ at a rate of about 500 lbs./hr., computed on the basis of total moles of sodium chlorate and of sodium chloride) the concentrated sulfuric acid is sent to compartment H at a rate of about 200 lbs./hr.; the aqueous chloride-chlorate feed solution is fed to compartment $B^2$ at a rate of about 500 lbs./hr.; and water is fed to the cathode compartment at a rate of about 1,000 lbs./hr. A gaseous mixture of chlorine dioxide and chlorine is continuously recovered at a rate of about 700 lbs./hr. total, about equally divided between the cathode and G compartments. Spent aqueous sodium chlorate and sodium chloride solutions wherein the concentrations of sodium chlorate and sodium chloride are about 0.5 N each, are continuously withdrawn from compartments $B^1$ and $B^2$ at a rate of about 1,300 lbs./hr., about equally divided between compartments. Byproduct aqueous sodium sulfate, which is about 6 N and has less than 0.01% of sulfuric acid, is continuously withdrawn from compartment S at a rate of about 300 lbs./hr. Spent aqueous sulfuric acid solution at about 2 Normal, with less than about 0.01% sodium sulfate, is continuously withdrawn from compartment H at a rate of about 150 lbs./hr. Aqueous sodium hydroxide solution, which contains 60–150, e.g., 80 g./l. of sodium hydroxide and less than 0.1% sodium chloride, is continuously recovered from the cathode compartment at a rate of about 1000 lbs./hr. Hydrogen is recovered from the cathode compartment at a rate of about 20 lbs./hr.

During the electrolysis-electrodialysis process the voltage drop in the cell is about 5 volts and the current density is about 2 amperes per square inch of electrode surface. The cell operates at a caustic efficiency of about 90% and a current efficiency of about 98%.

The chlorine dioxide-chlorine mixture which is recovered from the anode compartment contains about 0.63 parts of chlorine dioxide per part of chlorine and the chlorine dioxide-chlorine mixture which is recovered from compartment B and contains about 1.9 parts of chlorine dioxide per part of chlorine are combined. The resultant mixture is introduced into the base of a conventional chlorine dioxide absorption tower or column of the type illustrated in FIG. 4 of the article by W. N. Rapson in the Canadian Journal of Chemical Engineering in Volume 36 (1958) at page 3 and is contacted with a downward flowing countercurrent stream of water at ambient temperature to remove chlorine dioxide as about a 3% aqueous solution, which is recovered from the base of the tower, with the purified chlorine gas being recovered from the top of the tower. If desired, the aqueous chlorine dioxide solution can be cooled, according to a conventional technique, to precipitate chlorine dioxide as a solid hydrate containing about 16% chlorine dioxide, which can be recovered by filtration or decantation.

In a modification of the above laboratory cell for large scale operation the number of sets of compartments, $B^1$, S, H and G in the cell is increased from one, as in the present example, to 5, 10 and even as many as 50 or 100, thereby greatly augmenting the cell's capacity for production of chlorine dioxide and chlorine.

In another modification, the thickness of the cation-active permselective membranes is increased to 10 to 14 mils, at which thicknesses the caustic efficiency increases but the voltage drop also increases. Accordingly, although cation-active membranes of greater thicknesses are operative in the present process, it is preferred to employ the 7 mil cation-active permselective membranes, as described in Example 1. Cation-active membranes which are 4 mils thick are also used and are satisfactory, although caustic efficiency is decreased slightly. Similar changes are made in the anion-active membranes, with similar results.

The cation-active membranes of the present experiment do not show any deterioration in appearance, operating efficiency or selectivity toward ion diffusion, even after operation in the present process for considerable times and are expected to last for more than a year before replacement.

EXAMPLE 2

The procedure of Example 1 is repeated substantially as described except that the anion-active permselective membranes employed are AMFion 310 series anion type membranes (manufactured by American Machine and Foundry Co.) These membranes, which have thicknesses of about 6 mils (about 0.17 mm.), are proprietary fluorocarbon polymers containing a multiplicity of quaternary ammonium substituents as anion-exchanging groups. The cell utilizing these anion-active membranes is operated continuously with satisfactory membrane performances and with results substantially similar to those obtained in Example 1. However, the anion-active permselective membranes are not as resistant to deterioration as the cation-active membranes described.

EXAMPLE 3

The procedure of Example 1 is followed and essentially the same results are obtained, utilizing the cation-active RAI Research Corporation membranes identified as 18ST12S and 16ST13S, respectively, instead of the hydrolyzed copolymer of tetrafluoroethylene and sulfonated perfluorovinyl ether. The membranes stand up well under the described operating conditions and after continuous operation for several days are significantly better in appearance and operating characteristics, e.g., physical appearance, uniformity, voltage drop, than other cation-active permselective membranes available (except for hydrolyzed copolymers of perfluoroolefins and fluorosulfonated perfluorovinyl ether of the type utilized in Example 1, or the modifications thereof).

The invention has been described with respect to working examples and illustrative embodiments but it is not to be limited to these because it is evident that one of ordinary skill in the art will be able to utilize substitutes and equivalents without departing from the spirit of the invention or going beyond the scope of the claims.

What is claimed is:

1. An electrolytic-electrodialytic method for the manufacture of chlorine, chlorine dioxide, sulfuric acid-free alkali metal sulfate, alkali metal hydroxide substantially free of alkali metal halide, and hydrogen which comprises electrolyzing, electrodialyzing and chemically reacting in a cell having an anode compartment with an anode therein, a buffer compartment $B^1$, a sulfate compartment S, an acid compartment H, a chlorine dioxide generating compartment G, a buffer compartment $B^2$ and a cathode compartment with a cathode therein, there being from one to one hundred sets of compartments $B^1$, S, H and G intermediate the anode and the $B^2$ compartment, with the anode compartment being separated from $B^1$ by anion-active permselective membrane $M^{a-1}$, the $B^1$ and S compartments being separated by a cation-active permselective membrane $M^{c-1}$, the S And H compartments being separated by an anion-active permselective membrane $M^{a-2}$, the H and G compartments being separated by a cation-active permselective membrane $M^{c-2}$, the G and $B^2$ compartments being separated by an anion-active permselective membrane $M^{a-3}$ and the $B^2$ and cathode compartments being separated by a cation-active permselective membrane $M^{c-3}$, aqueous solutions resulting from feeding hydrogen chloride to the anode compartment, alkali metal chlorate and chloride to $B^1$ and $B^2$, sulfuric acid to H and water to the cathode compartment so that with the passage of electric current through the cell chloride and chlorate anions diffuse selectively from $B^1$ to the anode compartment through $M^{a-1}$, alkali metal cations diffuse selectively from $B^1$ to S through $M^{c-1}$, sulfate anions diffuse selectively from H to S through $M^{a-2}$, hydrogen ions diffuse selectively from H to G through $M^{c-2}$, chloride and chlorate anions diffuse selectively from $B^2$ to G through $M^{a-3}$, alkali metal cations diffuse selectively from $B^2$ to the cathode compartment through $M^{c-3}$, chloride, chlorate and hydrogen ions react to produce chlorine dioxide and chlorine in the anode compartment and in G, and alkali metal cations and water react to produce hydrogen and aqueous substantially alkali metal chloride-free alkali metal hydroxide in the cathode compartment, and recovering chlorine and chlorine dioxide from the anode compartment and G, spent aqueous alkali metal chloride and chlorate from $B^1$ and $B^2$, substantially sulfuric acid-free aqueous alkali metal sulfate solution from S, substantially alkali metal sulfate-free spent aqueous sulfuric acid from H, and hydrogen and substantially alkali metal chloride-free alkali metal hydroxide solution from the cathode compartment.

2. A method according to claim 1 wherein there is from 1 to 10 sets of compartments $B^1$, S, H and G intermediate the anode compartment and $B^2$, the alkali metal chloride and alkali metal chlorate charged are sodium chloride and sodium chlorate, producing sodium hydroxide, sodium sulfate, chlorine dioxide, chlorine and hydrogen, the $M^{c-1}$, $M^{c-2}$ and $M^{c-3}$ cation-active membranes are of the same cation exchange material, the $M^{a-1}$, $M^{a-2}$ and $M^{a-3}$ anion-active permselective membranes are of the same anion-exchange material and the cell operates at a temperature below about 105°C.

3. A method according to claim 2 wherein the material of the anion-active membranes is selected from the group consisting of quaternary ammonium-substituted fluorocarbon polymers and quaternary ammonium-substituted polymers derived from heterogeneous polyvinyl chloride, the material of the cation-active membranes is selected from the group consisting of hydrolyzed copolymers of perfluorinated olefin and fluorosulfonated perfluorinated vinyl ether, fluorinated polymers having pendant side chains containing sulfonyl groups which are attached to carbon atoms bearing at least one fluorine atom, with sulfonyl groups on one surface being in $-(SO_2NH)_nM$ form where M is H, $NH_4$, alkali metal or alkaline earth metal and $n$ is the valence of M, and the sulfonyls of the polymer on the other membrane surface being in $-(SO_3)_pY$ form wherein Y is a cation and p is the valence of the cation and when Y is H, M is also H, or being $-SO_2F$, and sulfostyrenated perfluorinated ethylene propylene copolymers, hydrogen chloride is charged to the anode as a concentrated aqueous solution, sodium chlorate and sodium chloride are charged to $B^1$ and $B^2$ as aqueous solutions wherein the concentration of sodium chloride and sodium chlorate are between about 1 Normal and the saturation concentrations of the salts in water, sulfuric acid is fed to H as a concentrated aqueous solution containing above about 80% of sulfuric acid and the cell is operated at a temperature of about 75° to 95°C.

4. A method according to claim 3 wherein a single $B^1$, S, H, G unit is present in the cell, the surface of the anode is of a material selected from the group consisting of graphite, noble metals, noble metal alloys, noble metal oxides, mixtures of noble metal oxides with valve metal oxides, and mixtures thereof on a valve metal, the surface of the cathode is selected from the group consisting of platinum, iridium, ruthenium, rhodium, graphite, steel and iron, the hydrolyzed copolymer is the reaction product of tetrafluoroethylene and a fluorosulfonated perfluorovinyl ether of the formula $$FSO_2CF_2CF_2OCF(CF_3)CF_2OCF=CF_2$$

with an equivalent weight of about 900 to 1,600, the fluorinated polymer with different side materials is a perfluorinated copolymer of tetrafluoroethylene and $FSO_2CF_2CF_2OCF(CF_3)CF_2OCF=CF_2$ in a molar ratio of about 7:1, M and Y are both sodium and $n$ and $p$ are both 1, and the sulfostyrenated perfluorinated ethylene propylene copolymer is about 16 to 18% styrenated and has from about two-thirds to thirteen-sixteenths of the phenyl groups therein monosulfonated, the thicknesses of the cation-active membranes and the anion-active membranes are between about 0.02 and 0.5 mm., the concentrations of sodium chloride and sodium chlorate in the aqueous solutions withdrawn from $B^1$ and $B^2$ are about 0.1 to 3 Normal, the concentration of sulfuric acid withdrawn from H is about 0.2 to 6 Normal, the concentration of sodium sulfate in the solution withdrawn from S is from about 0.5 to 5 Normal, and the chlorate, chloride, hydrochloric acid and sulfuric acid charged are in about stoichiometric proportions ±10%, with the proportion of water charged being stoichiometric or in excess, up to 500% excess.

5. A method according to claim 4 wherein the aqueous sulfuric acid feed to H is of an about 93 to 97% sulfuric acid, the hydrolyzed copolymer has an equivalent weight of from about 1,100 to 1,400, the cation-active and anion-active membranes. are mounted on a network or networks of material selected from the group consisting of polytetrafluoroethylene, asbestos, perfluorinated ethylene-propylene copolymer, polypropylene, titanium, tantalum, niobium, and noble metals, which have an area percentage of openings therein from about 8 to 80%, the proportions of reactants, except for water, are about stoichiometric and the substantially chloride-free sodium hydroxide solution produced contains about 60 to 250 grams/liter of sodium hydroxide and less than 1% sodium chloride.

6. A method according to claim 5 wherein the cell is operated at about 2.3 to 5 volts and at a current density of about 0.5 to 4 amperes/square inch of electrode surface, the anode and the cathode are of graphite, the aqueous sodium hydroxide solution recovered from the cathode compartment contains about 60 to 150 g./l. of sodium hydroxide of a sodium chloride content less than 0.1% and the chlorine dioxide and chlorine mixtures recovered from the anode compartment and G are contacted with water to separate them.

7. A method according to claim 6 wherein the cell operates at about 3.0 to 7 volts, with a current density of about 1 to 3 amperes/sq. in. of electrode surface and at a temperature of about 90°C., the membranes are from about 0.1 to 0.4 mm. thick, and are mounted on a network of polytetrafluoroethylene filaments with the area percentage of openings in the network being from 10 to 70%, the concentrations of sodium chlorate and sodium chloride in the feed solutions to compartments $B^1$ and $B^2$ are each about 3 Normal and the concentration of sodium chlorate and sodium chloride in the spent chloride-chlorate solutions withdrawn from $B^1$ and $B^2$ are each about 0.5 Normal.

8. A method according to claim 7 wherein the anode is of graphite having a density of about 1.68 to 1.78 gram/ml., the cathode is of mild steel, the cation-active membranes are of the hydrolyzed copolymer, having an equivalent weight of about 1,250, and the cell operates at a voltage of about 5 volts and at a current density of about 2 amperes/sq. in. of electrode surface.

9. A method according to claim 8 wherein the anion-active membrane material is a quaternary ammonium-substituted fluorocarbon polymer.

10. A method according to claim 8 wherein the anion-active membrane material is a quaternary ammonium-substituted polymer derived from a heterogeneous polyvinyl chloride.

* * * * *